United States Patent
Yin et al.

(10) Patent No.: US 11,590,613 B1
(45) Date of Patent: Feb. 28, 2023

(54) PREPARATION METHOD OF NANO-OXIDE DISPERSION STRENGTHENED STEEL

(71) Applicants: Huazhong University of Science and Technology, Wuhan (CN); Wuhan Temo Welding Consumables Co., Ltd., Wuhan (CN)

(72) Inventors: Shengming Yin, Wuhan (CN); Guoqiang Yi, Wuhan (CN); Youwei Yan, Wuhan (CN); Yaju Zhou, Wuhan (CN); Haicheng Tian, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 17/690,942

(22) Filed: Mar. 9, 2022

(30) Foreign Application Priority Data

Jan. 18, 2022 (CN) .......................... 202210052384.6

(51) Int. Cl.
| | | |
|---|---|---|
| *B23K 35/30* | (2006.01) | |
| *C22C 35/00* | (2006.01) | |
| *B23K 35/362* | (2006.01) | |
| *B23K 9/04* | (2006.01) | |
| *B33Y 70/00* | (2020.01) | |
| *B23K 103/04* | (2006.01) | |
| *B33Y 80/00* | (2015.01) | |

(52) U.S. Cl.
CPC .............. *B23K 35/308* (2013.01); *B23K 9/04* (2013.01); *B23K 35/362* (2013.01); *C22C 35/005* (2013.01); *B23K 2103/04* (2018.08); *B33Y 70/00* (2014.12); *B33Y 80/00* (2014.12)

(58) Field of Classification Search
CPC ......... B33Y 10/00; B33Y 30/00; B33Y 70/00; B33Y 80/00; B23K 35/308; B23K 35/362; B23K 9/04; C22C 35/005
See application file for complete search history.

(56) References Cited

FOREIGN PATENT DOCUMENTS

| | | |
|---|---|---|
| CN | 106756446 A | 5/2017 |
| CN | 106868383 A | 6/2017 |
| CN | 111590079 A | 8/2020 |

*Primary Examiner* — Alexandra M Moore
(74) *Attorney, Agent, or Firm* — Fei Hung Yang (57) ABSTRACT

The present disclosure belongs to the field of materials with metal structures, and specifically relates to a preparation method for a nano-oxide dispersion strengthened steel. The method includes mixing a ferrochromium alloy, a ferrotungsten alloy, a ferroalloy containing a rare earth element, an oxygen source and a reduced iron powder to obtain a mixture; wrapping the mixture in a steel strip, and conducting drawing reducing to obtain a flux-cored wire; and conducting arc additive manufacturing on the flux-cored wire on a substrate, and then conducting heat treatment to obtain the nano-oxide particle dispersion strengthened steel.

8 Claims, 5 Drawing Sheets

PREPARATION METHOD OF NANO-OXIDE DISPERSION STRENGTHENED STEEL

CROSS REFERENCE TO RELATED APPLICATION

This patent application claims the benefit and priority of Chinese Patent Application No. 202210052384.6, filed on Jan. 18, 2022, the disclosure of which is incorporated by reference herein in its entirety as part of the present application.

TECHNICAL FIELD

The present disclosure belongs to the field of materials with metal structures, and specifically relates to a preparation method for a nano-oxide dispersion strengthened steel.

BACKGROUND ART

With the daily increase of energy demands and the crisis of fossil fuels, nuclear energy has become a key means of developing new energy. In a nuclear energy system, a high-performance structural material that can work stably under high temperature, irradiation and corrosion is required. Due to great creep resistance at high temperature and radiation resistance, a nano-oxide dispersion strengthened steel has become a key material for the nuclear energy system at present. As there are nano-oxide particles with high stability, high density, small size and dispersed distribution in a matrix, the nano-oxide dispersion strengthened steel has excellent properties. On the one hand, the nano-oxide particles can improve the mechanical property of a material at high temperature by preventing dislocation movement and refining grains. On the other hand, point defects formed in the irradiation and helium produced in a nuclear reaction can be captured on an interface between the nano-oxide particles and the matrix to prevent large-size pores and helium bubbles formed in the material from affecting the mechanical performance. Therefore, a nano-oxide particle dispersion strengthened phase is the key to use steel materials in an extreme nuclear energy environment.

According to a traditional melting casting process, as the solidification time of a melting pool is long and the wettability between oxide particles and a melt is low, the oxide particles in the melting pool are significantly coarsened and aggregated during solidification, and slag formed by most of the oxide particles is removed from the melting pool so that dispersed distribution of the oxide particles cannot be achieved. In addition, components in complex shapes cannot be prepared so that demands of the nuclear energy systems for different structures cannot be met.

According to additive manufacturing, based on the principle of discrete accumulation, a heat source is controlled by a driving module to act on a raw material, and three-dimensional components with required structures are filled by using a three-dimensional model. By using the additive manufacturing, thoughts of traditional manufacturing methods are broken through, and components in any complex shape can be quickly and precisely manufactured. In addition, the additive manufacturing has the smelting characteristics of rapid cooling and solidification of a small melting pool so that the dispersed distribution of the oxides can be achieved. However, when rare earth oxides are directly added, loss of rare earth elements can still be caused, enough oxide strengthening phases cannot be formed in the matrix, and as a result, the nano-oxide dispersion strengthened steel has low mechanical performance.

SUMMARY

An objective of the present disclosure is to provide a preparation method for a nano-oxide dispersion strengthened steel. By using the method provided in the present disclosure, loss of a rare earth element in the process for preparing the nano-oxide dispersion strengthened steel can be avoided, and the obtained nano-oxide dispersion strengthened steel has excellent mechanical performance.

To achieve the objective above, the present disclosure provides the following technical solutions.

The present disclosure provides a preparation method for a nano-oxide dispersion strengthened steel. The method includes the following steps:

mixing a ferrochromium alloy, a ferrotungsten alloy, a ferroalloy containing a rare earth element, an oxygen source and a reduced iron powder to obtain a mixture;

wrapping the mixture in a steel strip, and conducting drawing reducing to obtain a flux-cored wire; and conducting arc additive manufacturing on the flux-cored wire on a substrate, and then conducting heat treatment to obtain the nano-oxide particle dispersion strengthened steel.

Preferably, the ferroalloy containing a rare earth element includes one or more selected from the group consisting of a yttrium-iron alloy, a cerium-iron alloy and a hafnium-iron alloy.

Preferably, a mass ratio of the ferrochromium alloy, the ferrotungsten alloy, the ferroalloy containing a rare earth element, the oxygen source, and the reduced iron powder is (12.86-20):(1.33-2.67):(8.33-16.67):(0.2-0.4):(60.26-77.28).

Preferably, the mixture further includes a ferroalloy powder containing a strengthening phase element;

the strengthening phase element in the ferroalloy powder containing a strengthening phase element includes one or more selected from the group consisting of silicon, titanium and zirconium; and a mass ratio of the ferroalloy powder containing a strengthening phase element to the reduced iron powder is (0.67-3.33):(60.26-77.28).

Preferably, the mixture further includes an arc stabilizer;

the arc stabilizer includes lithium fluoride and/or sodium fluoride; and the arc stabilizer is 0.2-0.5 wt % of the flux-cored wire.

Preferably, the mixture is 30-40% of a mass of the flux-cored wire; and the flux-cored wire has a diameter of 3.0-4.0 mm.

Preferably, the flux-cored wire includes the following components by mass fraction: 9-14% of chromium, 1-2% of tungsten, 0.8-1.0% of a rare earth element and the balance of iron; and the rare earth element includes one or more selected from the group consisting of yttrium, cerium and hafnium.

Preferably, the arc additive manufacturing and the heat treatment are conducted in a protective atmosphere.

Preferably, the arc additive manufacturing is conducted at a voltage of 20-30 V, a current of 150-200 A, a wire feeding speed of 5-10 m/min and a welding torch moving speed of 5-10 mm/s.

Preferably, the heat treatment is conducted at a temperature of 800-1,100° C. for 1-5 h.

The present disclosure provides a preparation method for a nano-oxide dispersion strengthened steel. The method includes the following steps: mixing a ferrochromium alloy, a ferrotungsten alloy, a ferroalloy containing a rare earth element, an oxygen source and a reduced iron powder to obtain a mixture; wrapping the mixture in a steel strip, and conducting drawing reducing to obtain a flux-cored wire; and conducting arc additive manufacturing on the flux-cored wire on a substrate, and then conducting heat treatment to obtain the nano-oxide particle dispersion strengthened steel. In the present disclosure, the ferrochromium alloy, the ferrotungsten alloy and the ferroalloy containing a rare earth element are used as raw materials and mixed in the form of a ferroalloy. Based on the smelting characteristics of rapid cooling and solidification of a small melting pool during the arc additive manufacturing, supersaturated solid solution of the rare earth element and an oxygen element in a matrix can be achieved. Then, a large number of uniform nano-oxide particles with dispersed distribution and small size are obtained by solid phase precipitation in the matrix after the heat treatment. In addition, as the compatibility between ferroalloy powders is great, a transition coefficient of the rare earth element can be increased, segregation and loss of the rare earth element are avoided, and the number density of nano-oxide particles in the matrix is increased, so that the mechanical performance of the nano-oxide dispersion strengthened steel is further improved.

DETAILED DESCRIPTION OF THE EMBODIMENTS

The present disclosure provides a preparation method for a nano-oxide dispersion strengthened steel. The method includes the following steps:

a ferrochromium alloy, a ferrotungsten alloy, a ferroalloy containing a rare earth element, an oxygen source and a reduced iron powder are mixed to obtain a mixture;

the mixture is wrapped in a steel strip, and drawing reducing is conducted to obtain a flux-cored wire; and arc additive manufacturing is conducted on the flux-cored wire on a substrate, and then heat treatment is conducted to obtain the nano-oxide particle dispersion strengthened steel.

In the present disclosure, unless otherwise specified, all raw materials required for preparation are commercially available products well known to those skilled in the art.

In the present disclosure, the ferrochromium alloy, the ferrotungsten alloy, the ferroalloy containing a rare earth element, the oxygen source and the reduced iron powder are mixed to obtain the mixture.

In the present disclosure, the ferroalloy containing a rare earth element preferably includes one or more selected from the group consisting of a yttrium-iron alloy, a cerium-iron alloy and a hafnium-iron alloy. When the ferroalloy containing a rare earth element preferably includes two or more selected from the group, a ratio of specific substances is not particularly limited in the present disclosure, and the substances may be mixed at any ratio. In the present disclosure, the rare earth element in the ferroalloy containing a rare earth element preferably includes one or more selected from the group consisting of yttrium, cerium and hafnium. In the present disclosure, yttrium in the yttrium-iron alloy preferably has a mass content of 3-6%, and further preferably 4-5%. Cerium in the cerium-iron alloy preferably has a mass content of 3-6%, and further preferably 4-5%. Hafnium in the hafnium-iron alloy preferably has a mass content of 3-6%, and further preferably 4-5%.

In the present disclosure, chromium in the ferrochromium alloy preferably has a mass content of 70%. In the present disclosure, tungsten in the ferrotungsten alloy preferably has a mass content of 75%.

In the present disclosure, the ferrochromium alloy, the ferrotungsten alloy and the ferroalloy containing a rare earth element are preferably mixed in the form of a powder.

In the present disclosure, the ferroalloys are used as raw materials. Based on the compatibility between the ferroalloys, the segregation of a component is reduced, and the problem of loss caused by directly adding a rare earth or a rare earth oxide is avoided. By using a ferroalloy addition method, supersaturated solid solution of the rare earth element in a matrix can well be achieved. Nano-oxide particles with small size and large number density are precipitated after the heat treatment and closely bonded to the matrix.

In the present disclosure, the oxygen source is preferably an oxide and further preferably includes one or more selected from the group consisting of titanium dioxide, zirconium oxide and silicon oxide. When the oxygen source includes two or more selected from the group, a ratio of specific substances is not particularly limited in the present disclosure, and the substances may be mixed at any ratio. In the present disclosure, the oxygen source is preferably mixed in the form of a powder.

In the present disclosure, a mass ratio of the ferrochromium alloy, the ferrotungsten alloy, the ferroalloy containing a rare earth element, the oxygen source, and the reduced iron powder is preferably (12.86-20):(1.33-2.67):(8.33-16.67):(0.2-0.4):(60.26-77.28), further preferably (13-19):(1.5-2.5):(8.5-16.5):(0.2-0.3):(61-77), and more preferably (13.5-18.5):(1.8-2.2):(9.0-16.0):(0.2-0.3):(61.5-76.5).

In the present disclosure, the mixture further preferably includes a ferroalloy containing a strengthening phase element. In the present disclosure, the ferroalloy containing a strengthening phase element preferably includes one or more selected from the group consisting of a ferrosilicon alloy, a ferrotitanium alloy and a ferrozirconium alloy. When the ferroalloy containing a strengthening phase element includes two or more selected from the group, a ratio of specific substances is not particularly limited in the present disclosure, and the substances may be mixed at any ratio. In the present disclosure, the strengthening phase element in the ferroalloy containing a strengthening phase element preferably includes one or more selected from the group consisting of silicon, titanium and zirconium. When the strengthening phase element includes two or more selected from the group, a ratio of specific substances is not particularly limited in the present disclosure, and the substances may be mixed at any ratio. In the present disclosure, silicon in the ferrosilicon alloy preferably has a mass content of 75%; titanium in the ferrotitanium alloy preferably has a mass content of 30%; and zirconium in the ferrozirconium alloy preferably has a mass content of 60%. In the present disclosure, the ferroalloy containing a strengthening phase element is preferably mixed in the form of a powder.

In the present disclosure, a mass ratio of the ferroalloy powder containing a strengthening phase element to the reduced iron powder is preferably (0.67-3.33):(60.26-77.28), further preferably (0.8-3.0):(60.5-77.0), and more preferably (1.0-2.8):(61.0-65.5).

In the present disclosure, the strengthening phase element is introduced into the mixture. On the one hand, grains can be refined. On the other hand, the strengthening phase element can be bonded to the rare earth element and the oxygen element to form a Y—Si—O, Y—Ti—O or Y—Zr—O oxide with higher strength and smaller size (including $Y_2SiO_5$, $Y_4Si_3O_{12}$, $Y_2Ti_2O_7$, $YSi_2O_6$, $Zr_3Y_4O_{12}$, $Y_6ZrO_{11}$, $Y_2Si_2O_7$ or $Y_2TiO_5$), and the number density and mechanical performance of the nano-oxide dispersion strengthened steel can be further improved.

In the present disclosure, the ferrochromium alloy, the ferrotungsten alloy, the reduced iron powder, the ferroalloy containing a rare earth element and the ferroalloy containing a strengthening phase element each preferably has a particle size of 80-200 mesh, further preferably 90-190 mesh, and more preferably 100-180 mesh. In the present disclosure, the oxygen source preferably has a particle size of 2,000-10,000 mesh, further preferably 3,000-9,000 mesh, and more preferably 4,000-8,000 mesh.

In the present disclosure, the mixture further preferably includes an arc stabilizer. In the present disclosure, the arc stabilizer preferably includes lithium fluoride and/or sodium fluoride. When the arc stabilizer includes the lithium fluoride and the sodium fluoride, a ratio of the two substances is not particularly limited in the present disclosure, and the two substances may be mixed at any ratio. In the present disclosure, the arc stabilizer is preferably 0.2-0.5 wt % of the flux-cored wire, and further preferably 0.3-0.4 wt %.

In the present disclosure, the mixing is preferably conducted under stirring conditions. The stirring is preferably conducted at a rotation speed of 40-80 rpm, further preferably 45-75 rpm, and more preferably 50-70 rpm. The stirring is preferably conducted for 2-5 h, further preferably 2.5-4.5 h, and more preferably 3-4 h. In the present disclosure, the stirring is preferably conducted in a three-dimensional mixing stirrer. In the present disclosure, the mixture is prepared by simple stirring. Compared with a powder metallurgy technology requiring high-energy ball milling for hundreds of hours to obtain a precursor powder in the prior art, a mixing method is simple, and the energy consumption is low.

After the mixing is completed, the method further preferably includes drying the obtained mixture. The drying is preferably conducted at a temperature of 100-150° C., further preferably 110-140° C., and more preferably 120-130° C. The drying is preferably conducted for 8-24 h, further preferably 9-23 h, and more preferably 10-22 h. In the present disclosure, the drying is preferably conducted in a vacuum drying oven.

In the present disclosure, the obtained mixture is wrapped in the steel strip, and the drawing reducing is conducted to obtain the flux-cored wire.

In the present disclosure, the steel strip is preferably an SPCC cold-rolled steel strip.

Before the wrapping is conducted, the method further preferably includes washing and drying the steel strip. In the present disclosure, the processes of washing and drying are not particularly limited, and processes known to those skilled in the art may be adopted.

In the present disclosure, the wrapping preferably includes the following processes: the steel strip is rolled into a U-shaped groove on a forming machine, the mixture is filled into the U-shaped groove, and the U-shaped groove is rolled and closed by using the forming machine.

In the present disclosure, the process of drawing reducing is not particularly limited, and a process known to those skilled in the art may be adopted.

In the present disclosure, the mixture is 30-40% of a mass of the flux-cored wire (that is, the mixture preferably has a filling rate of 30-40%), further preferably 32-38%, and more preferably 34-36%. In the present disclosure, the flux-cored wire preferably has a diameter of 3.0-4.0 mm, further preferably 3.2-3.8 mm, and more preferably 3.4-3.6 mm.

The flux-cored wire provided in the present disclosure preferably includes, by mass fraction, 9-14% of chromium, further preferably 10-13% of chromium, and more preferably 11-12% of chromium.

The flux-cored wire provided in the present disclosure preferably includes, by mass fraction, 1-2% of tungsten, further preferably 1.2-1.8% of tungsten, and more preferably 1.4-1.6% of tungsten.

The flux-cored wire provided in the present disclosure preferably includes, by mass fraction, 0.5-1.0% of a rare earth element, further preferably 0.55-0.95% of a rare earth element, and more preferably 0.6-0.9% of a rare earth element. In the present disclosure, the rare earth element preferably includes one or more selected from the group consisting of yttrium, cerium and hafnium. When the rare earth element includes two or more selected from the group, a ratio of specific elements is not particularly limited in the present disclosure, and the elements may be mixed at any ratio.

In the present disclosure, when the mixture includes the ferroalloy containing a strengthening phase element, the flux-cored wire provided in the present disclosure preferably includes, by mass fraction, 0.5-1.0% of a strengthening phase element, further preferably 0.6-0.9% of a strengthening phase element, and more preferably 0.7-0.8% of a strengthening phase element.

In the present disclosure, when the ferroalloy containing a strengthening phase element is the ferrosilicon alloy, the flux-cored wire provided in the present disclosure preferably includes, by mass fraction, 0.3-0.5% of silicon, further preferably 0.32-0.48% of silicon, and more preferably 0.35-0.45% of silicon. In a specific example of the present disclosure, when the ferroalloy containing a strengthening phase element is the ferrosilicon alloy and the oxygen source is the silicon oxide, the silicon preferably has a total content of 0.3-0.5%, further preferably 0.32-0.48%, and more preferably 0.35-0.45%.

In the present disclosure, when the ferroalloy containing a strengthening phase element is the ferrotitanium alloy, the flux-cored wire provided in the present disclosure preferably includes, by mass fraction, 0.8-1.0% of titanium, further preferably 0.82-0.98% of titanium, and more preferably 0.85-0.95% of titanium. In a specific example of the present disclosure, when the ferroalloy containing a strengthening phase element is the ferrotitanium alloy and the oxygen source is the titanium dioxide, the titanium preferably has a total content of 0.8-1.0%, further preferably 0.82-0.98%, and more preferably 0.85-0.95%.

In the present disclosure, when the ferroalloy containing a strengthening phase element is the ferrozirconium alloy, the flux-cored wire provided in the present disclosure preferably includes, by mass fraction, 0.3-0.5% of zirconium, further preferably 0.32-0.48% of zirconium, and more preferably 0.35-0.45% of zirconium. In a specific example of the present disclosure, when the ferroalloy containing a strengthening phase element is the ferrozirconium alloy and the oxygen source is the zirconium oxide, the zirconium preferably has a total content of 0.3-0.5%, further preferably 0.32-0.48%, and more preferably 0.35-0.45%.

The flux-cored wire obtained in the present disclosure has a small diameter and is synchronously melted under the action of arc heat to form a micro-melting pool. As the cooling speed is high, a direct reaction between the rare earth element and the oxygen in the melting pool can be reduced, the supersaturated solid solution of the rare earth element and the oxygen element in the solidified matrix is achieved, and burning loss and aggregation of the rare earth element are reduced. In addition, the filling rate is 30-40%. Based on a high filling rate, a design solution of wire components can be flexibly adjusted, and nano-oxide dispersion strengthened steels with different components are prepared to meet demands of more fields.

In the present disclosure, the arc additive manufacturing is conducted on the obtained flux-cored wire on the substrate, and then the heat treatment is conducted to obtain the nano-oxide particle dispersion strengthened steel.

In the present disclosure, the substrate preferably includes a low-carbon steel plate.

Before the arc additive manufacturing is conducted, the method further preferably includes washing and drying the substrate. In the present disclosure, the processes of washing and drying are not particularly limited, and processes known to those skilled in the art may be adopted.

In the present disclosure, the arc additive manufacturing preferably includes the following process: the flux-cored wire is put into an arc fuse additive manufacturing system, the washed and dried substrate is put on a workbench, and then the arc additive manufacturing is conducted.

In the present disclosure, the arc additive manufacturing is preferably conducted at a voltage of 20-30 V, further preferably 22-28 V, and more preferably 24-26 V. The arc additive manufacturing is preferably conducted at a current of 150-200 A, further preferably 160-190 A, and more preferably 170-180 A. The arc additive manufacturing is preferably conducted at a wire feeding speed of 5-10 m/min, further preferably 6-9 m/min, and more preferably 7-8 m/min. The arc additive manufacturing is preferably conducted at a welding torch moving speed of 5-10 mm/s, further preferably 6-9 mm/s, and more preferably 7-8 mm/s. In the present disclosure, the arc additive manufacturing is preferably conducted by using a reciprocating alternative printing method. In the present disclosure, an additive layer obtained after the arc additive manufacturing preferably has a thickness of 1-2 cm, further preferably 1.2-1.8 cm, and more preferably 1.4-1.6 cm. In the present disclosure, the arc additive manufacturing is preferably conducted in a protective atmosphere. The protective atmosphere preferably includes argon and/or carbon dioxide.

In the present disclosure, the heat treatment is preferably conducted at a temperature of 800-1,100° C., further preferably 850-1,050° C., and more preferably 900-1,000° C. The heat treatment is preferably conducted at a heating rate of 10° C./min. The heat treatment is preferably conducted for 1-5 h, further preferably 2-4 h, and more preferably 2.5-3 h.

After the heat treatment is completed, the method further preferably includes cooling an obtained steel material. The cooling is preferably conducted by air cooling or water cooling. In the present disclosure, the process of cooling is not particularly limited, and a process known to those skilled in the art may be adopted.

In the present disclosure, a nano-oxide in the nano-oxide dispersion strengthened steel preferably has a particle size of 10 nm and a number density of $10^{23}$ m$^3$.

Figure 5:
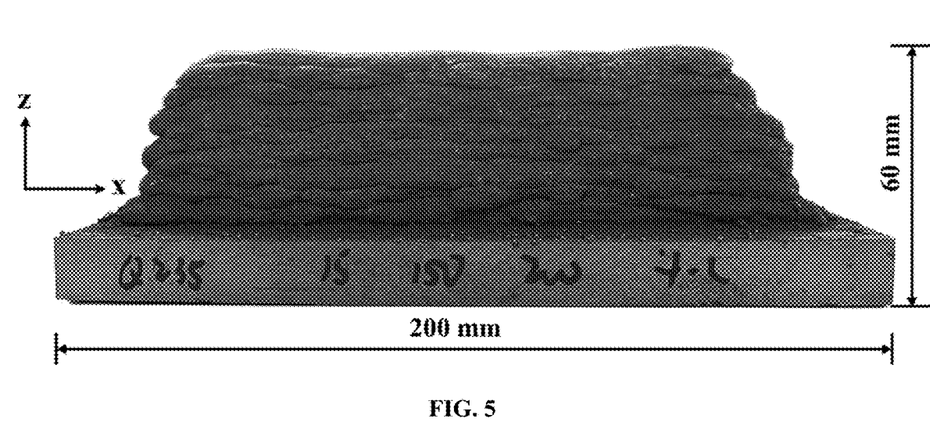
FIG. 5 is a physical diagram of the nano-oxide dispersion strengthened steel obtained in Example 1.

Two ends of the nano-oxide dispersion strengthened steel obtained in the present disclosure are flush without a falling phenomenon, as shown in FIG. 5.

According to the present disclosure, the characteristics of smelting and rapid solidification of the small melting pool during the arc additive manufacturing are fully utilized, and the supersaturated solid solution of the rare earth element and the oxygen element in the matrix is achieved to form a non-equilibrium supersaturated solid solution body. In the subsequent heat treatment process, the rare earth element and the oxygen element after the supersaturated solid solution are subjected to diffusion bonding in a solid phase and then precipitated. As the rare earth element and the oxygen element have a low diffusion rate in the solid phase, the size of rare earth oxide particles is reduced, the number density is increased, and ultra-fine rare earth oxide nanoparticles with uniform distribution are formed. The size is much smaller than that of oxide particles in components prepared by melting casting. Therefore, the room temperature strength, high temperature strength, high temperature resistance and radiation resistance of an alloy material are greatly improved.

A preparation process based on the arc additive manufacturing is adopted in the present disclosure, the deposition is fast, the energy efficiency is high, and the material utilization rate is high. The method is suitable for preparing large complex components in a large scale. Demands for the nano-oxide dispersion strengthened steel based on nuclear energy can be well met.

To further illustrate the present disclosure, the nano-oxide dispersion strengthened steel provided in the present disclosure is described in detail below in conjunction with the accompanying drawings and examples, but it should not be understood that the protection scope of the present disclosure is limited to the examples.

Example 1

750 g of a ferrochromium alloy (including 70% of chromium, 80-200 mesh), 50 g of a ferrotungsten alloy (including 75% of tungsten, 80-200 mesh), 493 g of a yttrium-iron alloy (including 6% of yttrium, 80-200 mesh), 111 g of a ferrotitanium alloy (including 30% of titanium, 80-200 mesh), 15 g of a ferrosilicon alloy (including 75% of silicon, 80-200 mesh), 7 g of titanium dioxide (2,000-10,000 mesh), 74 g of a reduced iron powder (80-200 mesh) and 7.5 g of sodium fluoride were stirred at a speed of 60 rpm for 2 h to obtain a mixed material. The mixed material was dried in a vacuum drying oven at a temperature of 150° C. for 12 h to obtain a mixture.

An SPCC cold-rolled steel strip was washed and dried and then rolled into a U-shaped groove on a forming machine, the mixture was filled into the U-shaped groove, and the U-shaped groove was rolled and closed by using the forming machine. Then, drawing reducing was conducted to obtain a flux-cored wire. Wherein, the obtained flux-cored wire had a diameter of 4 mm, the mixture had a filling rate of 40%, and the flux-cored wire included (by mass content) Fe-14Cr-1W-1Ti-0.3 Si-1Y$_2$O$_3$.

The flux-cored wire was put into an arc fuse additive manufacturing system. A washed and dried low-carbon steel plate was put on a workbench. Arc additive manufacturing was conducted by using a reciprocating alternative printing method in an argon atmosphere at a set operating voltage of 30 V, an operating current of 180 A, a wire feeding speed of 5 m/min and a welding torch moving speed of 10 mm/s to obtain an additive layer with a layer height of 2 mm. Then, an obtained sample was subjected to heat treatment in an annealing furnace at 1,000° C. for 3 h at a heating rate of 10° C./min in an argon atmosphere to obtain a nano-oxide dispersion strengthened steel.

Example 2

643 g of a ferrochromium alloy (including 70% of chromium, 80-200 mesh), 100 g of a ferrotungsten alloy (including 75% of tungsten, 80-200 mesh), 394 g of a yttrium-iron alloy (including 6% of yttrium, 80-200 mesh), 19 g of a ferrozirconium alloy (including 60% of zirconium, 80-200 mesh), 25 g of a ferrosilicon alloy (including 75% of silicon, 80-200 mesh), 7 g of titanium dioxide (2,000-10,000 mesh), 312 g of a reduced iron powder (80-200 mesh) and 15 g of lithium fluoride were stirred at a speed of 40 rpm for 3 h to obtain a mixed material. The mixed material was dried in a vacuum drying oven at a temperature of 100° C. for 24 h to obtain a mixture.

An SPCC cold-rolled steel strip was washed and dried and then rolled into a U-shaped groove on a forming machine, the mixture was filled into the U-shaped groove, and the U-shaped groove was rolled and closed by using the forming machine. Then, drawing reducing was conducted to obtain a flux-cored wire. Wherein, the obtained flux-cored wire had a diameter of 4 mm, the mixture had a filling rate of 40%, and the flux-cored wire included (by mass content) Fe-12Cr-2W-0.5 Si-0.3Zr-0.8$Y_2O_3$.

The flux-cored wire was put into an arc fuse additive manufacturing system. A washed and dried low-carbon steel plate was put on a workbench. Arc additive manufacturing was conducted by using a reciprocating alternative printing method in a carbon dioxide atmosphere at a set operating voltage of 25 V, an operating current of 200 A, a wire feeding speed of 10 m/min and a welding torch moving speed of 10 mm/s to obtain an additive layer with a layer height of 1.5 mm. Then, an obtained sample was subjected to heat treatment in an annealing furnace at 1,000° C. for 1 h at a heating rate of 10° C./min in an argon atmosphere to obtain a nano-oxide dispersion strengthened steel.

Example 3

643 g of a ferrochromium alloy (including 70% of chromium, 80-200 mesh), 67 g of a ferrotungsten alloy (including 75% of tungsten, 80-200 mesh), 525 g of a yttrium-iron alloy (including 6% of yttrium, 80-200 mesh), 42 g of a ferrozirconium alloy (including 60% of zirconium, 80-200 mesh), 115 g of a ferrotitanium alloy (including 30% of titanium, 80-200 mesh), 10 g of titanium dioxide (2,000-10,000 mesh), 98 g of a reduced iron powder (80-200 mesh) and 19 g of sodium fluoride were stirred at a speed of 80 rpm for 3 h to obtain a mixed material. The mixed material was dried in a vacuum drying oven at a temperature of 150° C. for 8 h to obtain a mixture.

An SPCC cold-rolled steel strip was washed and dried and then rolled into a U-shaped groove on a forming machine, the mixture was filled into the U-shaped groove, and the U-shaped groove was rolled and closed by using the forming machine. Then, drawing reducing was conducted to obtain a flux-cored wire. Wherein, the obtained flux-cored wire had a diameter of 3 mm, the mixture had a filling rate of 30%, and the flux-cored wire included (by mass content) Fe-9Cr-1W-0.8Ti-0.5Zr-0.8$Y_2O_3$.

The flux-cored wire was put into an arc fuse additive manufacturing system. A washed and dried low-carbon steel plate was put on a workbench. Arc additive manufacturing was conducted by using a reciprocating alternative printing method in a carbon dioxide atmosphere at a set operating voltage of 25 V, an operating current of 150 A, a wire feeding speed of 10 m/min and a welding torch moving speed of 5 mm/s to obtain an additive layer with a layer height of 2.0 mm. Then, an obtained sample was subjected to heat treatment in an annealing furnace at 800° C. for 5 h at a heating rate of 10° C./min in a carbon dioxide atmosphere to obtain a nano-oxide dispersion strengthened steel.

Example 4

673 g of a ferrochromium alloy (including 70% of chromium, 80-200 mesh), 114 g of a ferrotungsten alloy (including 75% of tungsten, 80-200 mesh), 562 g of a yttrium-iron alloy (including 6% of yttrium, 80-200 mesh), 36 g of a ferrozirconium alloy (including 60% of zirconium, 80-200 mesh), 17 g of a ferrosilicon alloy (including 75% of silicon, 80-200 mesh), 90 g of a ferrotitanium alloy (including 30% of titanium, 80-200 mesh), 8 g of titanium dioxide (2,000-10,000 mesh) and 21 g of lithium fluoride were stirred at a speed of 60 rpm for 5 h to obtain a mixed material. The mixed material was dried in a vacuum drying oven at a temperature of 120° C. for 16 h to obtain a mixture.

An SPCC cold-rolled steel strip was washed and dried and then rolled into a U-shaped groove on a forming machine, the mixture was filled into the U-shaped groove, and the U-shaped groove was rolled and closed by using the forming machine. Then, drawing reducing was conducted to obtain a flux-cored wire. Wherein, the obtained flux-cored wire had a diameter of 3 mm, the mixture had a filling rate of 35%, and the flux-cored wire included (by mass content) Fe-11Cr-2W-0.8Ti-0.3 Si-0.5Zr-1$Y_2O_3$.

The flux-cored wire was put into an arc fuse additive manufacturing system. A washed and dried low-carbon steel plate was put on a workbench. Arc additive manufacturing was conducted by using a reciprocating alternative printing method in an argon atmosphere at a set operating voltage of 20 V, an operating current of 180 A, a wire feeding speed of 5 m/min and a welding torch moving speed of 5 mm/s to obtain an additive layer with a layer height of 1.0 mm. Then, an obtained sample was subjected to heat treatment in an annealing furnace at 1,100° C. for 3 h at a heating rate of 10° C./min in an argon atmosphere to obtain a nano-oxide dispersion strengthened steel.

Comparative Example 673 g of a ferrochromium alloy (including 70% of chromium, 80-200 mesh), 114 g of a ferrotungsten alloy (including 75% of tungsten, 80-200 mesh), 36 g of a ferrozirconium alloy (including 60% of zirconium, 80-200 mesh), 17 g of a ferrosilicon alloy (including 75% of silicon, 80-200 mesh), 114 g of a ferrotitanium alloy (including 30% of titanium, 80-200 mesh), 43 g of yttrium oxide (2,000-10,000 mesh), 503 g of a reduced iron powder (80-200 mesh) and 21 g of lithium fluoride were stirred at a speed of 60 rpm for 5 h to obtain a mixed material. The mixed material was dried in a vacuum drying oven at a temperature of 120° C. for 16 h to obtain a mixture.

An SPCC cold-rolled steel strip was washed and dried and then rolled into a U-shaped groove on a forming machine, the mixture was filled into the U-shaped groove, and the U-shaped groove was rolled and closed by using the forming machine. Then, drawing reducing was conducted to obtain a flux-cored wire. Where, the obtained flux-cored wire had a diameter of 3 mm, the mixture had a filling rate of 35%, and the flux-cored wire included (by mass content) Fe-11Cr-2W-0.8Ti-0.3 Si-0.5Zr-1$Y_2O_3$.

The flux-cored wire was put into an arc fuse additive manufacturing system. A washed and dried low-carbon steel plate was put on a workbench. Arc additive manufacturing was conducted by using a reciprocating alternative printing method in an argon atmosphere at a set operating voltage of 20 V, an operating current of 180 A, a wire feeding speed of 5 m/min and a welding torch moving speed of 5 mm/s to obtain an additive layer with a layer height of 1.0 mm. Then, an obtained sample was subjected to heat treatment in an annealing furnace at 1,100° C. for 3 h at a heating rate of 10° C./min in an argon atmosphere to obtain a nano-oxide dispersion strengthened steel.

Performance Testing

Test Example 1

Figure 1:
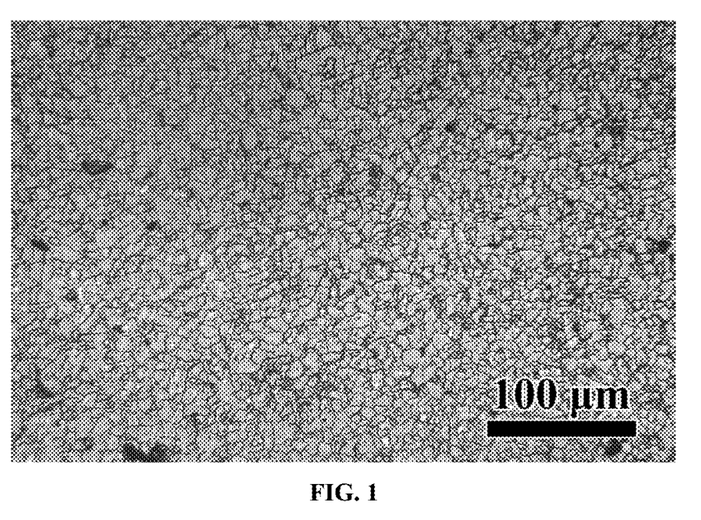
FIG. 1 is a diagram showing a metallographic microstructure of a nano-oxide dispersion strengthened steel obtained in Example 1.
Figure 4:
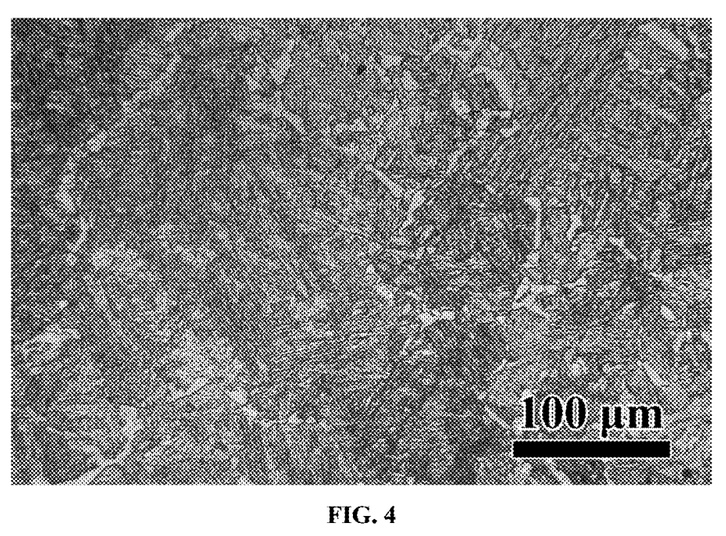
FIG. 4 is a diagram showing a metallographic microstructure of a nano-oxide dispersion strengthened steel obtained in Example 3.

The nano-oxide dispersion strengthened steels obtained in Examples 1 and 3 were subjected to a metallographic test. A metallographic microstructure of the nano-oxide dispersion strengthened steel in Example 1 was shown in FIG. 1. From FIG. 1, it could be seen that the nano-oxide dispersion strengthened steel obtained in this example had a ferrite microstructure without obvious defects. A metallographic microstructure of the nano-oxide dispersion strengthened steel in Example 3 was shown in FIG. 4. From FIG. 4, it could be seen that a matrix had a ferrite-martensite microstructure without obvious defects.

Test Example 2

Figure 2:
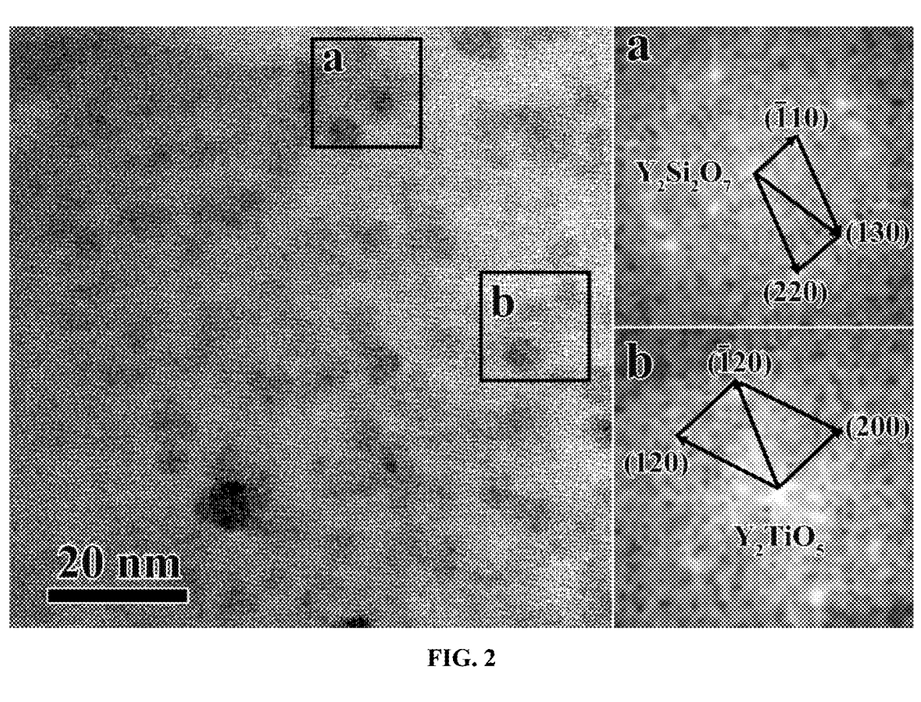
FIG. 2 is a diagram showing a high-resolution phase and Fourier transform of the nano-oxide dispersion strengthened steel obtained in Example 1.

The nano-oxide dispersion strengthened steel obtained in Example 1 was analyzed by using a transmission electron microscope, and an obtained high-resolution phase and Fourier transform were shown in FIG. 2. From FIG. 2, it could be seen that there were a large number of particles with dispersed distribution and a size below 10 nm in a matrix. It was identified that the particles included $Y_2Si_2O_7$ and $Y_2TiO_5$.

Test Example 3

Figure 3:
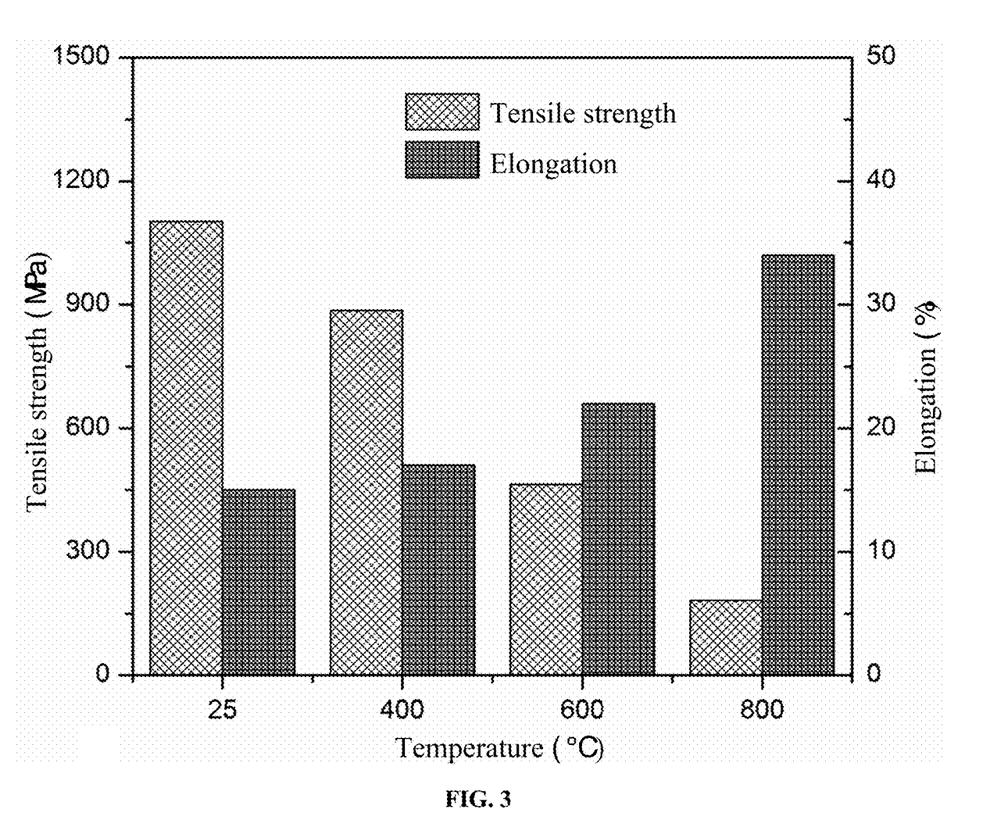
FIG. 3 is a diagram showing tensile property results of the nano-oxide dispersion strengthened steel obtained in Example 1 in a range of 25-800° C.

The mechanical performance of the nano-oxide dispersion strengthened steels obtained in Examples 1 to 4 and the comparative example was tested. Where, the microhardness was tested under a load of 1,000 g and pressure maintaining for 10 s. The tensile property was tested at a tensile rate of 0.12 mm/min with a sheet sample with a gauge length of 15 mm as a standard sample. Test results were shown in Table 1. Wherein, the tensile strength and elongation of the nano-oxide dispersion strengthened steel obtained in Example 1 were tested in a range of 25-800° C., and test results were shown in Table 2 and FIG. 3.

TABLE 1

Test results of mechanical performance of the nano-oxide dispersion strengthened steels obtained in Examples 1 to 4 and the comparative example

| | | Room temperature/25° C. | |
|---|---|---|---|
| | Microhardness/Hv | Tensile strength/MPa | Elongation/% |
| Example 1 | 344 | 1102 | 15 |
| Example 2 | 362 | 1184 | 12 |
| Example 3 | 310 | 986 | 18 |
| Example 4 | 326 | 1028 | 14 |
| Comparative Example | 275 | 855 | 21 |

From Table 1, it could be seen that the nano-oxide dispersion strengthened steel obtained in the present disclosure had a microhardness of 310-362 Hv, a tensile strength of 986-1,184 MPa and an elongation of 12-18%. Compared with the comparative example (by directly adding Y2O3), the mechanical performance was better.

TABLE 2

Performance test results of the nano-oxide dispersion strengthened steel obtained in Example 1 in a range of 25-800° C.

| | 25° C. | 400° C. | 600° C. | 800° C. |
|---|---|---|---|---|
| Tensile strength/MPa | 1102 | 886 | 463 | 182 |
| Elongation/% | 15 | 17 | 22 | 34 |

From Table 2, it could be seen that the nano-oxide dispersion strengthened steel obtained in the present disclosure had great tensile strength and elongation at room temperature and high temperature.

Although the present disclosure is described in detail in conjunction with the foregoing examples, the examples are merely a part rather than all of the examples of the present disclosure. Other examples may be obtained based on the examples without creative efforts, and these examples shall fall within the protection scope of the present disclosure.

What is claimed is:

1. A preparation method of a nano-oxide dispersion strengthened steel, comprising the following steps:

mixing a ferrochromium alloy, a ferrotungsten alloy, a ferroalloy containing a rare earth element, an oxygen source and a reduced iron powder to obtain a mixture, wherein, a mass ratio of the ferrochromium alloy, the ferrotungsten alloy, the ferroalloy containing a rare earth element, the oxygen source, and the reduced iron powder is (12.86-20):(1.33-2.67):(8.33-16.67):(0.2-0.4):(60.26-77.28);

wrapping the mixture in a steel strip, and conducting drawing reducing to obtain a flux-cored wire; and conducting arc additive manufacturing on the flux-cored wire on a substrate, and then conducting heat treatment to obtain the nano-oxide particle dispersion strengthened steel;

wherein, the heat treatment is conducted at a temperature of 800-1,100° C. for 1-5 h.

2. The preparation method according to claim 1, wherein, the ferroalloy containing a rare earth element comprises one or more selected from the group consisting of an yttrium-iron alloy, a cerium-iron alloy and a hafnium-iron alloy.

3. The preparation method according to claim 1, wherein, the mixture further comprises a ferroalloy powder containing a strengthening phase element;
the strengthening phase element in the ferroalloy powder containing a strengthening phase element comprises one or more selected from the group consisting of silicon, titanium and zirconium; and
a mass ratio of the ferroalloy powder containing a strengthening phase element to the reduced iron powder is (0.67-3.33):(60.26-77.28).

4. The preparation method according to claim 1, wherein, the mixture further comprises an arc stabilizer;
the arc stabilizer comprises lithium fluoride and/or sodium fluoride; and
the arc stabilizer is 0.2-0.5 wt % of the flux-cored wire.

5. The preparation method according to claim 1, wherein, the mixture is 30-40% of a mass of the flux-cored wire; and the flux-cored wire has a diameter of 3.0-4.0 mm.

6. The preparation method according to claim 5, wherein, the flux-cored wire comprises the following components by mass fraction: 9-14% of chromium, 1-2% of tungsten, 0.5-1.0% of a rare earth element and the balance of iron; and
the rare earth element comprises one or more selected from the group consisting of yttrium, cerium and hafnium.

7. The preparation method according to claim 1, wherein, the arc additive manufacturing and the heat treatment are conducted in a protective atmosphere.

8. The preparation method according to claim 1 or 7, wherein, the arc additive manufacturing is conducted at a voltage of 20-30 V, a current of 150-200 A, a wire feeding speed of 5-10 m/min and a welding torch moving speed of 5-10 mm/s.

* * * * *

UNITED STATES PATENT AND TRADEMARK OFFICE
CERTIFICATE OF CORRECTION

| | | |
|---|---|---|
| PATENT NO. | : 11,590,613 B1 | Page 1 of 1 |
| APPLICATION NO. | : 17/690942 | |
| DATED | : February 28, 2023 | |
| INVENTOR(S) | : Shengming Yin et al. | |

It is certified that error appears in the above-identified patent and that said Letters Patent is hereby corrected as shown below:

On the Title Page

Item (73) The Assignees that should appear are listed below:
Huazhong University of Science and Technology
Wuhan Temo Welding Consumables Co., Ltd.

Signed and Sealed this
Third Day of September, 2024

Katherine Kelly Vidal
*Director of the United States Patent and Trademark Office*